United States Patent
Given et al.

[11] 3,808,408
[45] Apr. 30, 1974

[54] COUNTER PROBE ASSEMBLY

[75] Inventors: William T. Given, La Porte; Edwin L. Stillman, East Chicago, both of Ind.

[73] Assignee: Wilson Pharmaceutical & Chemical Corporation, Chicago, Ill.

[22] Filed: June 19, 1972

[21] Appl. No.: 264,298

[52] U.S. Cl.... 235/92 PC, 235/92 R, 340/146.3 SY
[51] Int. Cl. ............................................. G06m 11/00
[58] Field of Search....... 235/92 MS, 92 PC, 92 PK; 340/146.3 SY; 346/139; 178/18

[56] References Cited
UNITED STATES PATENTS

| | | | |
|---|---|---|---|
| 3,462,548 | 8/1969 | Rinder | 340/146.3 SY |
| 3,145,367 | 8/1964 | Crane | 340/146.3 SY |
| 2,120,172 | 6/1938 | Burnett et al. | 235/92 PK |
| 2,511,202 | 6/1950 | Fulboam | 235/92 PC |
| 3,344,259 | 9/1967 | Degelman | 235/92 PC |
| 3,393,299 | 7/1968 | Baker | 235/92 MS |

*Primary Examiner*—Paul H. Henon
*Assistant Examiner*—Joseph M. Thesz
*Attorney, Agent, or Firm*—Dressler, Goldsmith, Clement & Gordon, Ltd.

[57] ABSTRACT

An omnidirectional counting and marking probe for counting and marking colonies of bacteria. A pivot rod is mounted in a hand holdable tubular body. The rod mounts a marker at one end and a contactor at the other. When the marker engages a surface to mark the surface, irrespective of the angle of attack, the pivot rod moves to displace the contactor into engagement with a stationary contactor to close a circuit and to signal a counter that engagement has taken place.

5 Claims, 7 Drawing Figures

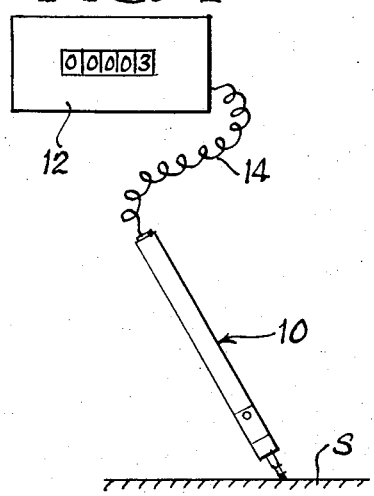
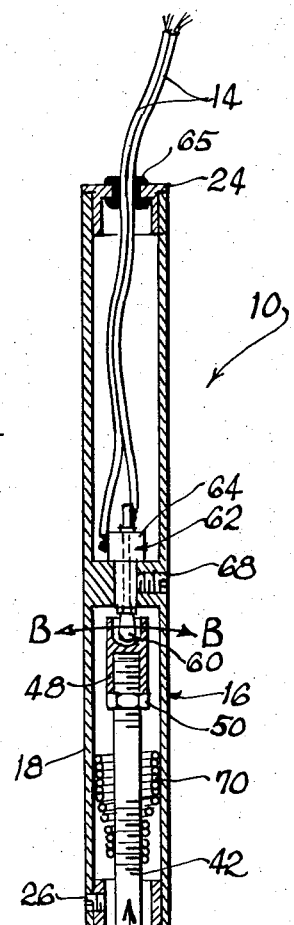
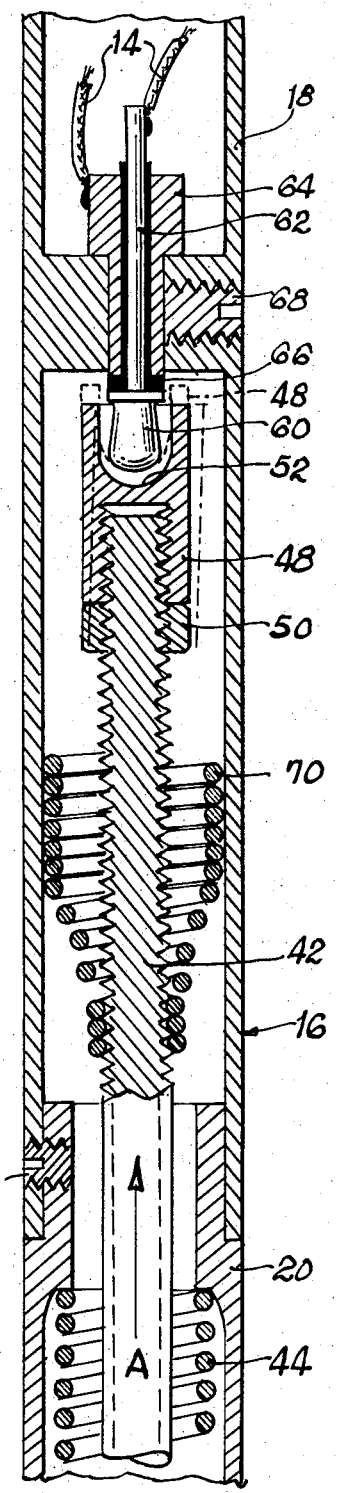
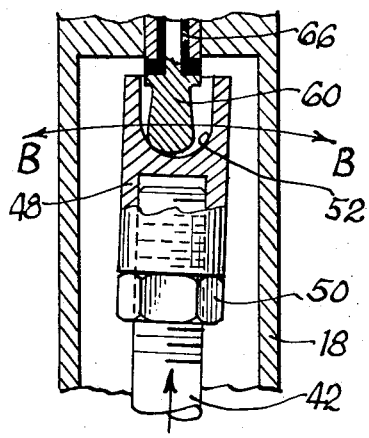
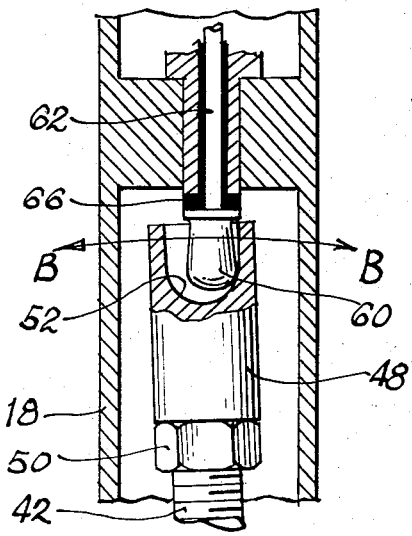

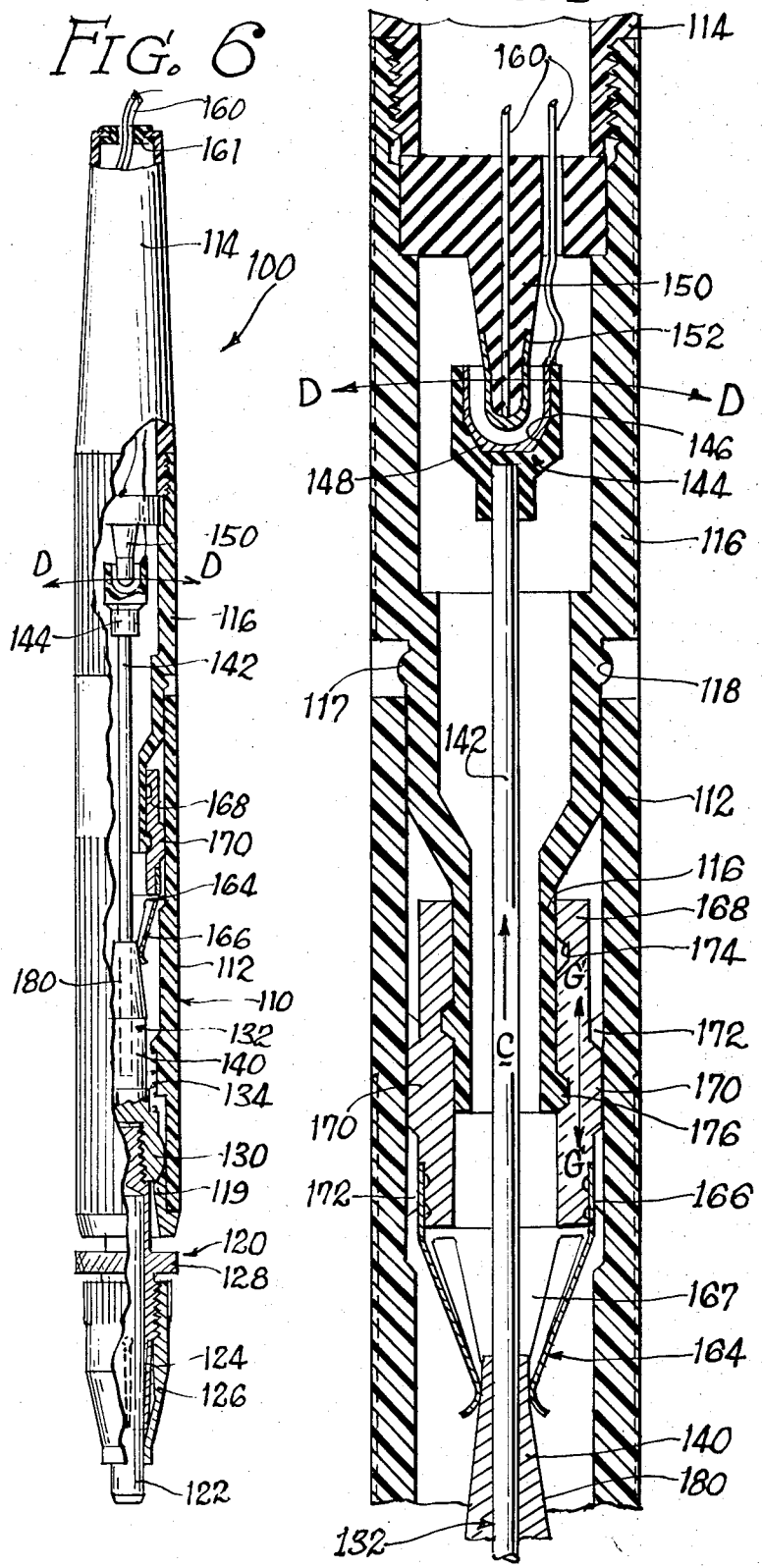

COUNTER PROBE ASSEMBLY

This invention relates to an improved hand holdable probe, such as a colony counter probe for counting the number of colonies of bacteria present in a given specimen.

In testing for the presence of bacteria, many of the procedures which have been developed require the visual observation and manual counting of the number of colonies of bacteria present in a given specimen. This is usually accompanished by providing a specimen on a slide surface on which the colonies are visually observable for counting.

To make certain that each of the colonies is counted to give an accurate count, and therefore an accurate test result, two things are normally done. First of all, each of the colonies is counted. Secondly, as each of the colonies is counted, an adjacent visually observable mark is made to indicate that a colony has been counted so that it will not be counted again.

Various devices have been made for marking each colony visually to indicate that each has been counted. Other devices have been devised to signal automatically when a colony has been marked, thereby automatically to count the colonies marked, and to totalize the number of colonies observed in a given specimen.

To make the totalizing of the colonies counted as foolproof as possible, especially so that relatively unskilled labor may be used to perform the counting operation, it has been considered desirable to provide a device which will both mark and automatically count and totalize each time a colony is marked. A major disadvantage of some available devices which have marked and simultaneously counted has been the requirement that they be held substantially in a predetermined position and orientation with respect to the surface they are to contact and mark. Other available devices have required a special probe and cooperating electrically sensitive paper or the like which must be juxtaposed with the specimen to be examined.

In accordance with this invention, the disadvantages and drawbacks attendant the use of prior art colony counting devices are avoided, and a novel and highly effective counting probe and assembly is provided. An omnidirectional counting probe of this invention may be made approximately the same size and shape as a conventional writing implement, such as a ballpoint pen, and may be held by a user in any manner in which a user normally holds such an implement. When the omnidirectional probe of this invention is used, it will surely and certainly signal each engagement with a surface concurrently with the marking of that surface, thereby to mark the colony as having been counted, and to count the colony.

A preferred counting probe of this invention marks a surface and simultaneously closes an electrical circuit to acutate a remote counting unit. It performs both functions regardless of the angle of engagement with the surface contacted by the marking element, because when the surface contacting element engages the surface, a contactor secured with the marking element will be deflected to provide a signal indicating the engagement, which signal is then automatically transmitted to a counter to totalize that engagement with earlier counted engagements.

The surface contacting element projects from one end of a tubular probe body and is mounted in the body on a pivot means for limited oscillatory and axial movement with respect to the tubular body. The pivot means is mounted on the tubular body for oscillation with respect to the body and for movement axially inwardly of the tubular body, either or both in response to engagement by the contacting element with a surface.

The pivot means is provided with an elongate shaft assembly that extends inwardly of the tubular body and away from the surface contacting element. The shaft mounts a first contactor spaced from the pivot means and the tubular body mounts a second contactor adjacent the first contactor. Preferably the contactors comprise a female, cup-shaped contactor and a male prong-like contactor which projects into the cup, but which is in spaced relation thereto. When the shaft is moved axially inwardly, the male contactor will contact an inner end portion of the cup member and when the shaft is oscillated about the pivot means the male contactor will engage an interior side portion of the female cup member, in each case to close a circuit, to which closing a counter is responsive.

A spring normally biases the pivot means and shaft axially outwardly of the tubular body. When the surface contacting element engages a surface, the spring may compress to allow the shaft to move axially inwardly of the tubular body.

A further spring which circumscribes and centers the shaft is provided in the tubular body at a point remote from the pivot means. This spring maintains the shaft, the shaft secured contactor and the surface contacting element in predetermined neutral or inactive positions within the tubular body. However, when a lateral force is exerted against the surface contacting element, the shaft and its contactor will oscillate about the pivot means, against the centering force provided by the further spring. When the lateral deflection force is relieved, as by raising the probe from engagement with a surface, the further spring will return the shaft and surface contacting element to the predetermined neutral position. The further spring may be adjustable axially of the shaft to increase or to decrease the force required laterally to deflect the shaft and associated contactor from the neutral position.

Because a counting probe of this invention is responsive to contact between a surface contacting element and a surface to be contacted regardless of the angle of attack (whether vertical or near horizontal) of the contacting element, i.e., it will cause the contactors to engage under axial and lateral forces, it may be considered to be an omnidirectional probe.

The surface contacting element may comprise a crayon marker or other suitable marking means, such as a liquid marker, for providing a visual indication that a mark has been made, so that both the visual indication and the counting and totalizing of a succession of marks made may be accomplished simultaneously, and with a minimum of skill.

Further objects, features and advantages of this invention will become apparent from the following description and drawings, of which:

FIG. 1 is a schematic view of a counting probe assembly in accordance with this invention;

FIG. 2 is an enlarged longitudinal, cross-sectional view of a counting probe of this invention;

FIG. 3 is an enlarged view of a portion of FIG. 2;

FIGS. 4 and 5 are fragmentary views of a portion of FIG. 3, showing the counting contactors in different positions of engagement;

FIG. 6 is an enlarged, longitudinal cross-sectional view of a further counting probe of this invention; and FIG. 7 is an enlarged view of a portion of FIG. 6.

Referring now to FIG. 1, a hand holdable counting probe 10 is shown in engagement with a surface S to be marked, such as a surface juxtaposed in known manner with a specimen including a plurality of colonies of bacteria to be counted. Probe 10 is connected to a counter 12 by conductors 14. Each time the counting probe 10 is brought into engagement with surface S, the probe marks surface S and provides a signal to which counter 12 is responsive, as by closing an electrical circuit through conductors 14, thereby indicating that marking engagement between the counting probe 10 and the surface S has occurred.

A preferred embodiment of a counting probe of this invention is illustrated in FIGS. 2 and 3. As there shown, counting probe 10 includes an elongate tubular body assembly 16 comprising a tubular barrel 18, a tubular barrel extension 20, a tubular barrel sleeve 22 and a barrel cap 24. Barrel extension 20 is telescopically seated in one end of tubular barrel 18 and is removably secured therein by a suitable locking means, such as a bayonet lock or a set screw 26. Barrel sleeve 22 is secured, as by a press fit, to the other end of barrel extension 20. Barrel cap 24 is secured, as by a press fit, within the opposite end of tubular barrel 18. Alternatively, threaded connectors instead of press fit connectors may be used.

The tubular body assembly 16 mounts a removable and interchangeable surface contacting assembly 28 for limited oscillatory and axial movement or deflection with respect to the tubular body. Surface contacting assembly 28 comprises a surface contacting element 30, which may be a marking element, such as a crayon or fluid marker, such as a pen. A gripping clip 32 grips a crayon and is removably securable to a marker mount 34. Marker mount 34 is preferably tapped to facilitate the removable securance of surface contacting assembly 28 to a mounting assembly.

A preferred mounting assembly of this invention comprises a pivot means which may define a spherical ball-like pivot surface, such as ball 40, mounted for pivotal and oscillatory engagement with the body assembly 16. Ball 40 is threadedly mounted on a shaft means or pivot rod 42. Ball 40 is held in an inactive position, such as that illustrated in FIG. 2, between a spring member, such as compression spring 44 and a confronting ball seat 46 provided on sleeve 22. After ball 40 is positioned against spring 44, sleeve 22 is secured to barrel extension 20, and ball 40 is then both restrained against movement outwardly of the body assembly and biased axially outwardly of the tubular body by spring member 44. The pivot rod 42 may be threaded cooperatively to removably secure and mount surface contacting assembly 28.

Pivot rod 42 extends inwardly of the tubular body 16 and rearwardly of ball 40. An inner portion of pivot rod 42 securely mounts a contactor member 48. The contactor member 48 defines an internally threaded bore which receives a threaded portion of pivot rod 42. Contactor member 48 is locked in a fixed position relative to the length of the shaft 42 by a lock nut 50.

Contactor member 48 may be a female contactor which defines a rearwardly opening cup-shaped bore 52. When pivot rod 42 is in the neutral position illustrated in FIG. 2, bore 52 receives and surrounds, in spaced relation, a fixedly mounted male contactor member 60. Male contactor member 60 is positioned so that if the pivot rod 42 moves either axially (in the direction of the arrow A) or oscillatably about pivot ball 40 (in the direction of the double-headed arrow B), a surface portion of the cup-shaped bore 52 will move into contact with contactor 60.

Male contactor 60 may be one of the two contacts of a coaxial plug assembly 62. The other of the contacts of the plug assembly 62 is contact 64 which is insulated from contactor 60 by insulator 66. Plug assembly 62 is fixedly secured to the tubular barrel assembly 16 as by a set screw 68 which also electrically connects contact 64 to tubular barrel 18. Because the body assembly of the embodiment of FIGS. 2-5 is of a conducting metal throughout, such as aluminum, when male contactor member 60 engages cup bore 52, as illustrated by FIGS. 4 and 5, a circuit is completed, as through brass contactor member 48, steel pivot rod 42, brass ball 40, aluminum body assembly 16 and steel contact 64. Conductors 14 are responsive to the completion and closing of this circuit and provide a signal and impulse to which the counter 12 is responsive, thereby to indicate that the male and female contactor members 48 and 60 have been brought into engagement. Conductors 14 are suitably connected to plug assembly 62 and project through cap 24 and through a rubber grommet 65 mounted therein.

A stabilizer spring assembly is mounted in the tubular body. It is in engagement with an inner wall of the body and with pivot rod 42 and is mounted for adjustable axial movement along pivot rod 42. Stabilizer spring 70 serves to maintain pivot rod 42 in a neutral, central position, such as that illustrated in FIG. 2, and serves to resist lateral and oscillatable movement of the rod 42, hence to resist movement of the contactor 48 into engagement with contactor 60. The stabilizer spring 70 is mounted for axial movement lengthwise of the shaft, as by threaded engagement by a portion of spring 70 with a threaded portion of the shaft, thereby to provide for adjustment of the force required to deflect contactor 48 in the direction of the double-headed arrow B-B. The closer the stabilizer spring 70 is to the pivot means 40, the less the resistance of the contacting element 30 and contactor 48 to lateral deflection, hence the less the resistance to pivoting and oscillation about pivot ball 40. The more distant the stabilizer spring 70 is from the ball 40, i.e., the closer it is to contactor 48, the greater the resistance of the spring to lateral deflection and oscillation of the contactor 48 and the contacting element 30.

After the stabilizer spring 70 has been adjusted axially to predetermine the degree of force required to deflect contactor 48, the barrel extension 20 and associated ball, pivot rod, contacting assembly and contactor 48 is locked in position with respect to the tubular barrel 18 by set screw 26. A user than holds the counting probe 10 in any comfortable, convenient and usual position, such as in the position illustrated in FIG. 1. The surface contacting element 30 is then brought into engagement with the surface to be marked, and as it is pressed into engagement with that surface to mark, depending upon the angle of attack, pivot rod 42 is either deflected axially inwardly (generally in the direction of the arrow A), laterally (as in a direction indicated by the double-headed arrow B-B) or both axially and laterally. In all cases the contactor 48 will move into engagement with contactor 60. FIG. 3, in phantom, illustrates movement solely axially; FIG. 5 illustrates solely lateral deflection and FIG. 4 illustrates combined axial and lateral deflection, each resulting in engagement between contactors 48, 60, hence the completion of the circuit and the provision of a signal to which a counter 12 is responsive as to the contacting element marks the surface S. A typical electronic counter which will totalize in response to the closing of an electrical circuit is described in U.S. Pat. No. 2,548,478. The omnidirectional mounting thereby assures the counting of a marked colony, regardless of the manner in which a counting probe 10 is held and used by a user.

Counting probe 10 may be approximately 5½ inches in length and about three-eighths inch in diameter, and may be appropriately shaped for convenience of handling. It may mount other than crayon contacting elements. It may operate on very low currents and voltages so that the use of the body itself as part of the signal circuit will cause no discomfort whatsoever to a user.

FIGS. 6 and 7 illustrate a further counting probe 100 of this invention. Counting probe 100 comprises an elongate tubular body assembly 110, in this case of an insulating material, such as plastic. Body assembly 110 may comprise a tubular barrel 112, a tubular cap 114, and a rotatable sleeve 116. Rotatable sleeve 116 and tubular barrel 112 are snap connected to each other for relative rotation by an annular bead 117 on sleeve 116 received in a complementary annular groove 118 in barrel 112. A ball seat 119 is seated in press-fit engagement in the lower end of barrel 112.

Tubular body assembly 110 mounts a surface contacting assembly 120 for limited oscillatory and axial movement relative to body assembly 110. Contacting assembly 120 comprises a surface contacting element 122, such as a crayon, a spring chuck 124 to hold the crayon in place, and a chuck sleeve 126. Chuck sleeve 126 is threadedly secured to a connecting member 128 which in turn is secured to a mounting assembly.

The mounting assembly comprises a pivot element, such as ball surface element 130, which is secured to a pivot rod means 132. The ball element 130 and associated pivot rod means 132 are biased by a compression spring member 134 against a confronting shoulder of ball seat 119. Spring member 134 bears against a shoulder on tubular barrel 112, and against a shoulder associated with pivot rod means 132 and ball element 130.

Pivot rod means 132 may comprise a pivot rod member 140 which may be integrally molded with ball element 130 which is secured to a pivot rod connector 142. Pivot rod connector 142 extends rearwardly of pivot rod member 140 and at its free end mounts a female contactor member 144. Contactor member 144 defines a bore suitable to receive pivot rod connector 142 and is secured against axial movement relative to pivot rod connector 142, as by a pressfit connection.

Contactor member 144 defines a rearwardly opening bore 146 which is lined with a cup-shaped conducting conducting contact 148. When contactor member 144 is in its neutral, inactive position, such as that illustrated in FIGS. 6 and 7, bore 146 and contact 148 receive and surround, in spaced relation, a fixed male contactor member 150 which is surfaced with a conducting contact 152.

Each of contacts 148 and 152 is electrically connected to a conductor 160 so that when contacts 152 and 148 are moved into engagement with each other, a counter, like counter 12, will be operated, as in the manner described in connection with the embodiment of FIGS. 1 – 5. However, in the embodiment of FIGS. 6 and 7 the circuit is completed through contacts 148, 152, rather than through the probe body itself, as was the case with the embodiment of FIGS. 1 to 5. Thus a greater current and higher voltage may be used with the probe 100 than with the probe 10. Conductors 160 pass through a rubber grommet 161 in the end of cap 114.

A stabilizer spring assembly 164 is mounted in the tubular body assembly 110. Spring assembly 164 mounts a conical leaf spring 166 having a plurality of elongate, circumferentially spaced leaf spring elements 167, and is mounted for axial movement in the direction of the doubleheaded arrow G-G'. Stabilizer spring assembly 164 serves to maintain pivot rod means 132 in a neutral, centered position, such as that illustrated in FIGS. 6 and 7, and serves to resist lateral, oscillatable movement of the rod means 132, hence movement of the contact 148 into engagement with contact 152.

The stabilizer spring assembly 164 is also mounted for axial movement lengthwise of the rod means 132 to adjust the force required to deflect the contactor member 144 in the direction of the double-headed arrow D-D. As such, conical leaf spring 166 is secured to a tubular slide 168. Slide 168 mounts keys 170 which are restrained against lateral and circumferential movement by axial keyways 172. Slide 168 defines a spiral female thread 174 which is threaded on a tubular lower end portion of rotatable sleeve 116. Sleeve 116 defines a complementary spiral male thread 176 so that as sleeve 116 is rotated relative to slide 168, via bead and groove 117, 118, slide 168 moves in a direction G–G'. Spring element 167 moves along an inclined surface portion 180 of pivot rod member 140 and exerts a greater force resisting oscillatory movement as it is moved in the direction G', and exerts a lesser force resisting oscillatory movement as it is retracted and moved in the direction G.

After the stabilizer spring assembly 164 has been adjusted to preset the degree of force required laterally to deflect contactor member 144, the probe 100 is ready for use. It is then held in any comfortable, convenient and usual position, such as that illustrated in FIG. 1, and the surface contacting element 122 is brought into engagement with the surface to be marked. As it is pressed into engagement with that surface to effect marking, depending upon the angle of attack, the pivot rod means 132 is either moved axially inwardly (generally in the direction of arrow C), laterally (as in a direction indicated by the doubleheaded arrow D—D), or both axially deflects and oscillatably deflects the contactor member 144 to bring the contacts 148, 152 into engagement. The omnidirectional mounting thereby assures the counting of a marked colony, regardless of the angle at which a counting probe 100 is brought into engagement with a surface by a user.

Although a cup-shaped contactor has been illustrated and described as being fixed with the pivot rod means and movable into contact with a fixed male contactor, it is clear that the parts may be reversed without detracting from the effectiveness and omnidirectionality of probes constructed in accordance with this invention. Furthermore other pivoted, and axially resilient and stabilizing mounting means may be used in lieu of those described herein and the invention of this application is not intended to be limited only to those described herein. Still other modifications and changes may be made in the embodiments illustrated and described herein, and without departing from the spirit and scope of this invention, and accordingly it is intended that the invention shall be considered as being limited only as may be necessary in view of the claims.

What is claimed is:

1. An assembly adapted to mark a surface to be examined and adapted to cause a counter to be advanced when a mark is made on the surface, comprising:
   a tubular housing;
   a rod means extending at least partially within said housing in axial alignment therewith;
   means rockably mounting said rod means intermediate its ends near the front end of said housing to said housing;
   marking means extending from the front end portion of said housing and connected to the front end portion of said rod means, said marking means being adapted to mark the surface;
   first electrical contact means fixedly mounted within said housing near the rear end portion thereof;
   second electrical contact means mounted on the rear end portion of said rod means in axial alignment with said housing spaced from said first contact means to engage said first contact means when said marking means engages the surface to cause said rod to move;
   a spring means surrounding an intermediate portion of said rod means rearwardly from its rockable connection with said housing to urge said rod means resiliently into axial alignment with said housing, said spring means having a cylindrical portion and having an end portion engaging said rod means; and
   first and second electrical conductors for supplying an electrical advance signal to the counter for advancing it, said first conductor being connected electrically in said housing and said second conductor being electrically connected to said second contact means, said rod means being connected to said second contact means, said end portion of said spring means being mounted to be moved axially into each of a selected plurality of positions relative to said rod to enable the adjustment of the biasing tension of said spring means acting on said rod means, said spring means including an intermediate portion, said first contact means comprising a male contact element, said second contact means comprising a female contact element, said female contact element being cup-shaped with its open mouth loosely receiving said male element therewithin in a spaced-apart relationship.

2. An assembly according to claim 1, wherein said means rockably mounting said rod includes ball means on said rod means, said housing having an internal socket portion for engaging said ball means, a second spring being mounted within said housing for urging resiliently said ball means forwardly into engagement with said socket portion so that axial movement of said marking means relative to said housing causes said rod means to move a rearward direction axially against the force of said second spring to in turn cause said second contact means to engage said first contact means, whereby said second spring causes said ball means and thus said rod means to return forwardly until said ball engages said socket portion when the force causing the rearwardly-directed axial movement of said marking means is removed.

3. An omnidirectional colony counting probe comprising an elongate hand holdable tubular body, a replaceable surface contactor and marker projecting from one end of said tubular body, means pivotally and resiliently mounting said surface contacting element on said body for limited oscillatory and axial movement with respect to said tubular body in response to contact and marking by said surface contactor and marker of a surface associated with colonies to be counted, and including a spring and an elongate shaft means extending inwardly of said tubular body from said one end, and spaced signal producing contactors, one mounted on said shaft means for movement therewith and the other fixedly mounted on said tubular body, said one being movable into contact with the other in response to the engagement of a surface by said surface contactor and marker regardless of the angle at which the tubular body is oriented with respect to said surface for providing a signal (1) that a solely axial movement has occurred, (2) that a solely oscillatory movement has occurred, and (3) that a combination of axial and oscillatory movements has occurred, and further comprising a separate stabilizer spring positioned about said shaft means and in contact with said shaft means to control the force required to oscillate said shaft means about said pivot mounting means, and means mounting said stabilizer spring in said body for movement axially of said tubular body into one of a plurality of selected positions lengthwise of said shaft means, including a slide means keyed to said tubular body and mounting said stabilizer spring.

4. An omnidirectional, hand holdable counting probe in accordance with claim 3 wherein said movable contactor defines a female member and said fixed contactor defines a male member disposed within said female member and normally being positioned in spaced relation within said female member.

5. An omnidirectional, hand holdable colony counting probe in accordance with claim 3 wherein said pivotal mounting means comprises spherical surface means mounted for oscillation within said tubular body and for movement axially inwardly of said tubular body.

* * * * *